United States Patent [19]
Ray et al.

[11] Patent Number: 5,950,666
[45] Date of Patent: *Sep. 14, 1999

[54] LEAK-PREVENTING TOILET FLUSH VALVE ASSEMBLY

[76] Inventors: Lamar R. Ray, 1304 Baycliff Rd., Virginia Beach, Va. 23454; Ronald Smelkinson, 2333 Smith Ave., Chesapeake, Va. 23325

[ * ] Notice: This patent is subject to a terminal disclaimer.

[21] Appl. No.: 09/070,837

[22] Filed: May 1, 1998

Related U.S. Application Data

[63] Continuation of application No. 08/800,470, Feb. 14, 1997, Pat. No. 5,775,366.

[51] Int. Cl.$^6$ .......................... F16K 31/20; F16K 31/26; F16K 33/00
[52] U.S. Cl. .................................. 137/410; 4/324; 4/366; 4/415; 137/421; 137/426; 137/436; 137/444; 137/451
[58] Field of Search ................................ 4/324, 366, 415; 137/410, 420, 421, 426, 434, 436, 442, 443, 444, 451; 251/294

[56] References Cited

U.S. PATENT DOCUMENTS

| | | | |
|---|---|---|---|
| 2,020,463 | 11/1935 | Fillmann | 137/400 |
| 2,075,548 | 3/1937 | Schaser | 137/418 |
| 2,837,111 | 6/1958 | Mueller | 137/410 |
| 3,095,577 | 7/1963 | Clark | 4/333 |
| 3,171,424 | 3/1965 | Shames et al. | 137/218 |
| 4,110,849 | 9/1978 | LaFaver | 137/435 |
| 4,114,208 | 9/1978 | Imler | 137/410 |
| 4,351,071 | 9/1982 | Clar | 4/415 |
| 4,615,056 | 10/1986 | Grant | 4/366 |
| 4,700,413 | 10/1987 | Lopez | 4/415 |
| 4,843,657 | 7/1989 | Orr | 137/410 |
| 4,965,891 | 10/1990 | Antunez | 137/410 |
| 5,016,295 | 5/1991 | Criswell | 4/415 |
| 5,179,739 | 1/1993 | Mann | 137/410 |
| 5,211,204 | 5/1993 | Mikol | 137/410 |
| 5,232,011 | 8/1993 | Royalty | 137/410 |
| 5,282,280 | 2/1994 | Wodeslavsky | 4/366 |
| 5,285,533 | 2/1994 | Chen | 4/415 |
| 5,287,882 | 2/1994 | Mikol | 137/410 |
| 5,327,931 | 7/1994 | Royalty et al. | 137/410 |
| 5,524,299 | 6/1996 | Dalfino | 137/410 |
| 5,542,448 | 8/1996 | Campbell et al. | 137/410 |

*Primary Examiner*—George L. Walton
*Attorney, Agent, or Firm*—Miller, White, Zelano, & Branigan, P.C.

[57] ABSTRACT

A leak preventing detent apparatus for a toilet flush valve assembly in which an inlet valve (13) to a toilet flush tank (11) is controlled by an inlet valve control device (14, 14a, 16, 17), and an outlet flush valve (21) is controlled by a flush lever (19). The detent apparatus includes a follower member (28) that is moved in response to movement of the flush lever at the initiation of a flush cycle, and a detent (25) that is operative to prevent opening of an inlet valve (26) except when a flush cycle is deliberately initiated. In a preferred form of the invention, a primary inlet valve (26) is provided upstream of the usual inlet valve (13) that is controlled by an inlet valve control device, such as a float (14, 14a, 16, 17), and the detent apparatus effectively cooperates with the primary inlet valve to maintain it closed unless a flush cycle is deliberately initiated. The detent member may be hydraulically damped (37–42) to provide a timed delay of its movement into inlet valve closing position. In the preferred form of the invention, the leak preventing apparatus is capable of preventing inflow of water into a toilet flush tank regardless of the position or condition of the inlet valve control device, or the outlet flush valve from the tank, or the usual water inlet valve, unless the flush lever is operated to deliberately initiate a flush cycle. In another form of the invention, the detent member (45, 58, 65, 80, 90, 100) acts directly on the inlet valve (13) to maintain it closed until a flush cycle is deliberately initiated.

14 Claims, 9 Drawing Sheets

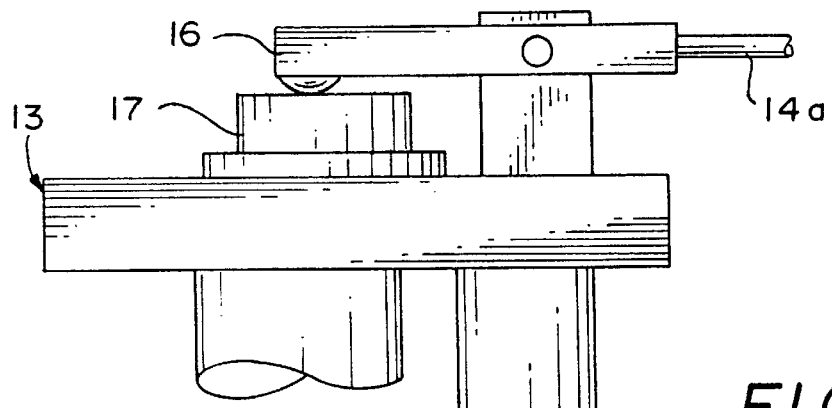
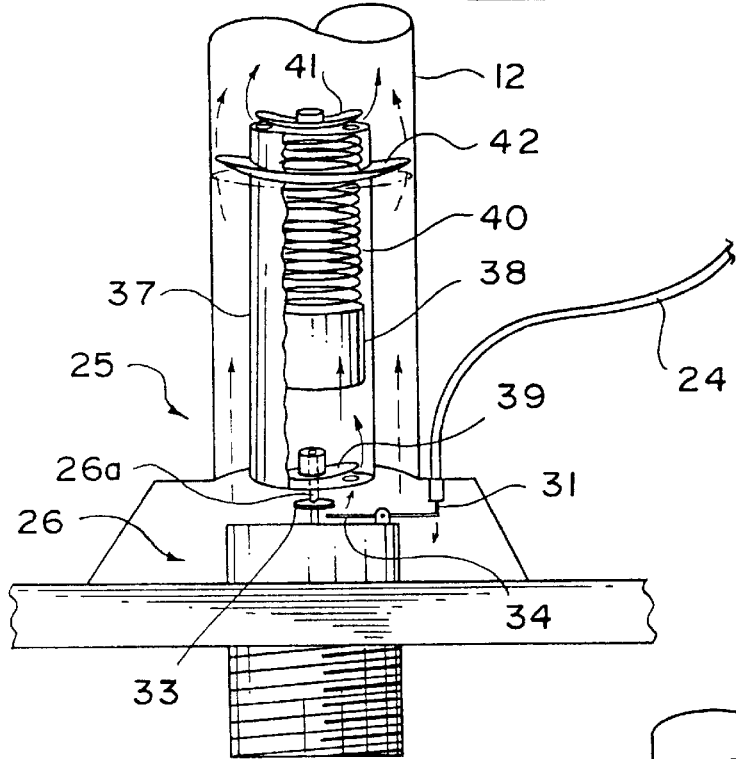
FIG. 2
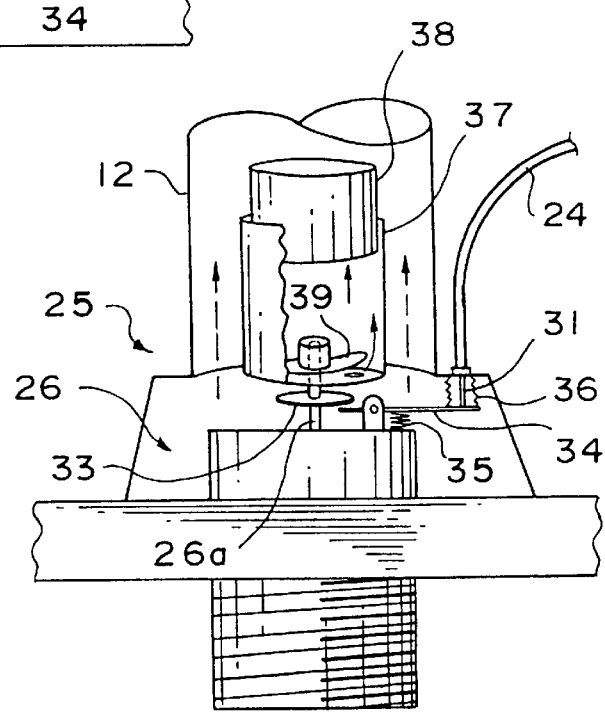
FIG. 3

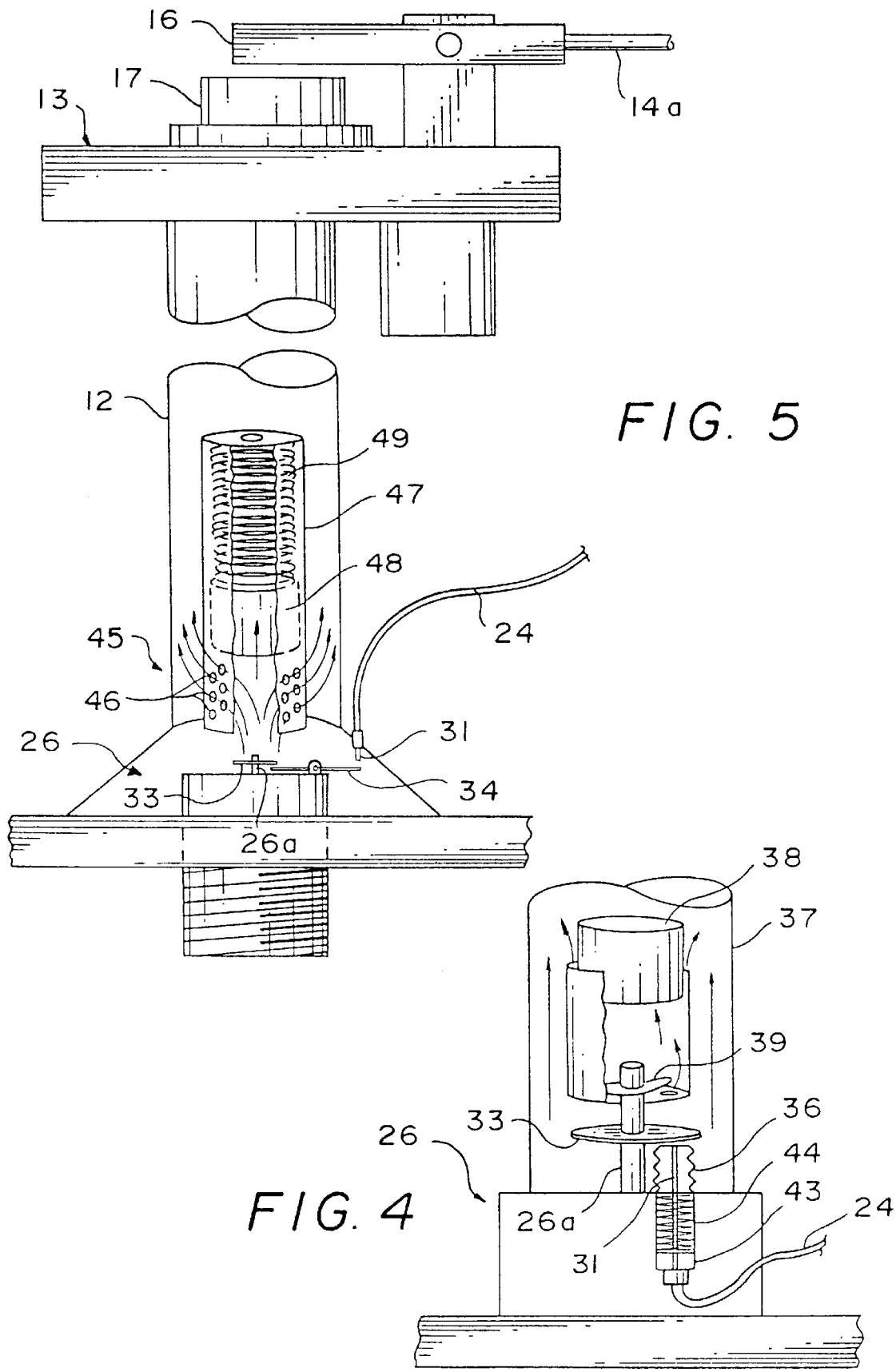

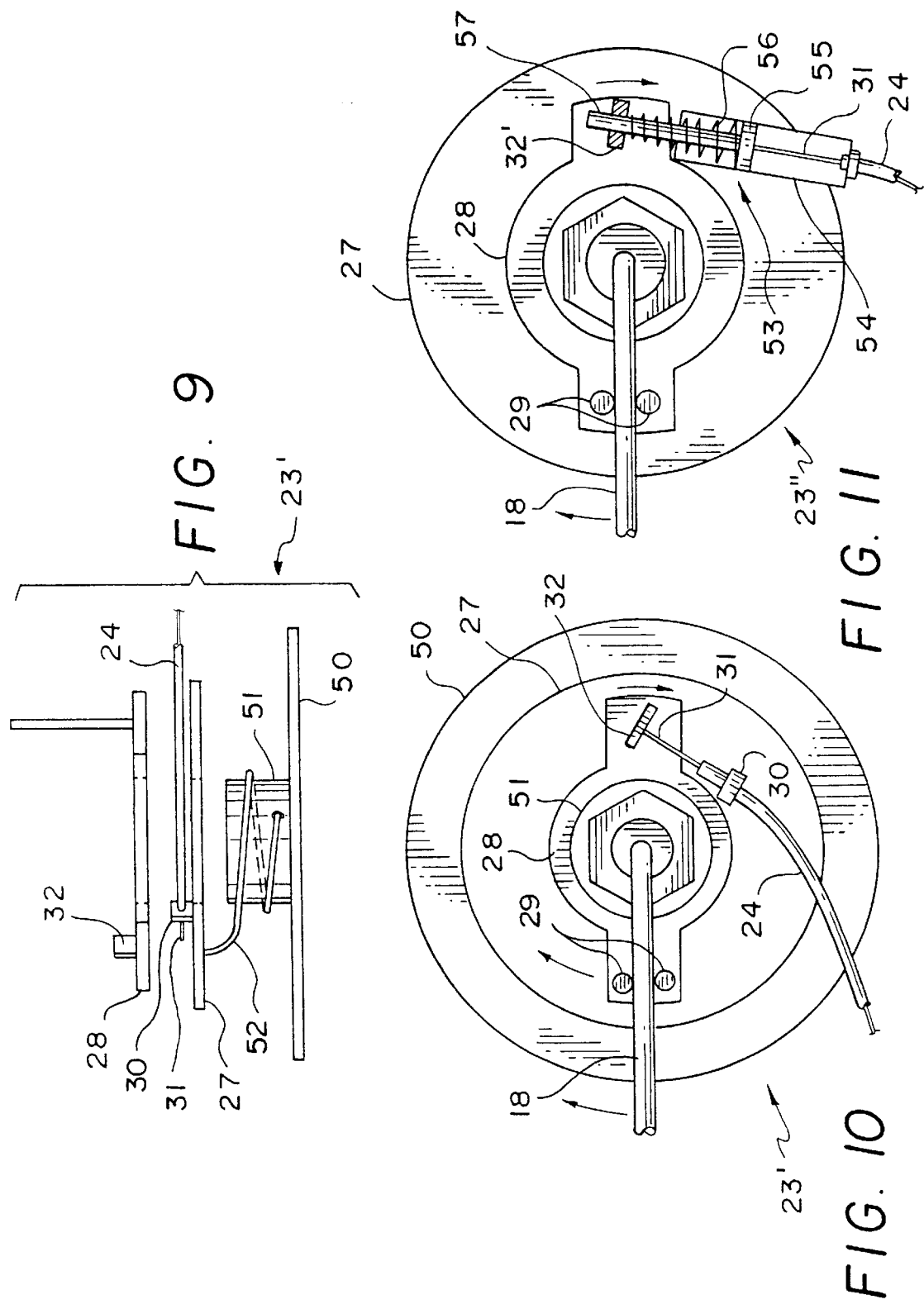

LEAK-PREVENTING TOILET FLUSH VALVE ASSEMBLY

This application is a continuation of U.S. Pat. No. 5,775,366 which resulted from U.S. Ser. No. 08/800,470, filed Feb. 14, 1997.

BACKGROUND OF THE INVENTION

1. Field of the Invention

This invention relates to flush assemblies for toilets. More particularly, the invention relates to a means which prevents opening of the water inlet valve to the toilet flush tank until a flush cycle is deliberately initiated, thereby preventing continued loss of water from the flush tank in the event there should be a leak from the tank caused, for example, by a malfunction in either the water inlet valve or the water outlet valve from the tank.

2. Description of the Prior Art

A large variety of toilet flush assemblies are known in the prior art. Most of the toilet flush assemblies currently in use, especially in residential applications, utilize a float assembly to control opening and closing of the water inlet valve to the flush tank. When a flush handle is operated to open the flush valve for releasing water from the tank, the float drops, permitting a water inlet valve to open to enable water to flow into the tank and refill it. As the level of water in the tank rises, the float also rises and eventually shuts off the water inlet valve, precluding further flow of water into the tank. However, it is not uncommon for a leak from the tank to develop, e.g., past the water outlet valve, whereby the level of water in the flush tank gradually falls, resulting in lowering of the float and opening of the water inlet valve to introduce more water into the flush tank. This cycle repeats continuously so long as the leak remains unrepaired. Over time, a substantial amount of water is wasted.

Most people repair these leaky toilets as soon as they are discovered. However, some leaks may not be readily apparent, or a needed repair may not be made for other reasons, with the result that a substantial amount of water is lost through leaky toilets.

Numerous solutions have been offered in the prior art to prevent continued loss of water in the event that a leak should develop from a toilet flush tank. Examples of such efforts are shown in the patents submitted with the information disclosure statement filed herewith. These prior art systems provide means which act on the float to prevent the float from moving to open the water inlet valve except when a deliberate flush cycle is initiated. However, these prior art systems are relatively complicated and expensive in construction, and some of them may not be reliable in operation. Many of them also require extensive modification of the conventional flush system, and cannot be conveniently retrofitted into existing systems.

Moreover, since the prior art systems work by retaining the float in an elevated position, they are incapable of functioning to prevent continued leakage if the float never returns to its elevated position. These prior art systems therefore cannot prevent leakage of water from the flush tank in the event of a catastrophic failure of the flush outlet valve, or leakage of water into the float, or other eventuality which prevents return of the float to its normal elevated position, or even a malfunction in the usual water inlet valve.

Accordingly, there is need for a simple and inexpensive means which is reliable in operation and which prevents continued loss of water in the event of leakage from a toilet flush tank. There is also need for such a device which prevents continued loss of water in the event of a catastrophic failure of the flush outlet valve, or other cause for failure of the float to return to its elevated position for closing the water inlet valve.

SUMMARY OF THE INVENTION

The present invention provides a simple, reliable and inexpensive means which prevents opening of a water inlet valve to a toilet flush tank until the flush handle is deliberately operated. This prevents continual loss of water in the event of a leak, since the water inlet valve will not open to introduce additional water until the flush valve is deliberately operated. In contrast, when a leak develops in a conventional flush system, the water level drops in the flush tank, resulting in a lowering of the float, which in turn results in opening the water inlet valve to let more water into the tank, and therefore more water to leak from the system.

The means of the invention comprises a detent which acts either on an inlet valve or on a float which controls an inlet valve to keep the inlet valve closed until a flush cycle is deliberately initiated.

In a preferred form of the invention, the detent is an hydraulic mechanism that comprises a piston reciprocable in a cylinder, wherein the piston is biased into a first position to maintain the inlet valve closed, and upon actuation of the flush actuator is movable to a second position to enable the inlet valve to open. The hydraulic mechanism preferably includes a delay feature which delays for a predetermined interval of time movement of the piston from its second position to its first position. The period of delay is selected to enable the inlet valve to remain open long enough to introduce a predetermined quantity of water into the flush tank, but after the delay the piston will move to its first position to close the inlet valve regardless of whether there is any water in the tank. The hydraulic mechanism thus prevents continued loss of water from the flush tank in the event there should be a malfunction in either the inlet valve or the flush outlet valve, or a leakage of water from the tank due to some other cause.

In a first embodiment of this form of the invention, the hydraulic mechanism is positioned immediately downstream of and adjacent to a primary inlet valve, and a float controlled secondary inlet valve is positioned downstream of the hydraulic mechanism and primary inlet valve. An actuator means is connected between the flush actuator and the primary inlet valve to open the inlet valve to introduce water into the cylinder and move the piston from its first position to its second position. When the flush actuator is operated, an outlet valve from the tank is opened to release water from the tank, causing the float to fall and thereby open the secondary inlet valve to reintroduce water into the tank. If the system is operating properly, the outlet valve will close, enabling the tank to fill with water, and causing the float to rise to close the secondary inlet valve. During the time the tank is filling with water, the piston is moving from its second position to its first position in accordance with the delay feature, so that it will contact the primary inlet valve and move it to its closed position to prevent further inflow of water into the tank. Closing of the primary inlet valve by the hydraulic mechanism thereby prevents further flow of water into the tank and continued leakage of water from the tank in the event the float fails to close the secondary inlet valve or water leaks from the tank due to some other cause.

In accordance with a second embodiment of this form of the invention, there is only one inlet valve to the flush tank, normally held closed by a float mechanism and by the hydraulic detent mechanism of the invention. An actuator means is connected between the flush actuator and the hydraulic mechanism to move the hydraulic mechanism from a first position blocking opening movement of the inlet valve to a second position enabling the inlet valve to open when a flush cycle is initiated. Initiation of a flush cycle also opens an outlet valve from the tank, to release water from the tank, resulting in the float moving to a position to enable the inlet valve to open. The hydraulic mechanism in this embodiment also includes a delay feature which delays return of the hydraulic mechanism to its valve blocking position so that the inlet valve can remain open long enough to introduce a predetermined quantity of water into the flush tank. However, following the predetermined delay interval, the hydraulic mechanism moves to close the inlet valve regardless of the level of water in the tank, thus preventing continued loss of water from the tank in the event there is a malfunction in the outlet valve or leakage from the tank due to some other cause.

In another form of the invention, the detent comprises a mechanical plunger biased into a first position to block opening movement of the inlet valve, and is movable by an actuator means connected between the detent and the flush actuator to a second position in unblocking relationship to the inlet valve. The detent is latched in its second position so that it cannot return to its first position because of release of the actuator means. The inlet valve is controlled by a float mechanism which normally holds the inlet valve closed, but which moves to enable the inlet valve to open when the level of water in the tank falls after the outlet valve is opened. The detent is latched in its second position, and is unlatched by the float mechanism when the float returns to its position to close the inlet valve.

In a further form of the invention, a mechanical detent is biased into a first position to block opening movement of a float mechanism which controls operation of the inlet valve, and is movable to a second position by actuator means connected between the flush actuator and the detent. In its first, blocking position the detent engages the float mechanism to hold it in a valve closing position to thereby prevent opening of the inlet valve and introduction of water into the flush tank until a flush cycle is deliberately initiated. In this form of the invention, the float mechanism includes a float arm, and the float arm may have an articulated or hinged connection between its ends to enable the float to fall with the water level, independently of movement of a rear portion of the float arm which holds the inlet valve closed. This minimizes stress on the detent and float arm assembly in the event of a leak occurring in the system. The articulated joint in the float arm enables the free end of the float arm to pivot only in a downward direction, so that when the water level rises it will elevate the float and the float arm to close the inlet valve. The articulated joint between the ends of the float arm is intended merely to prevent or relieve stress on the float assembly and detent mechanism when the water level falls due to a leak. The pivot is irrelevant when the flush valve is deliberately operated, since the detent will be released to enable the entire float arm to pivot downwardly under the weight of the float.

The invention also has utility in other systems which use a diaphragm or other means to close the inlet valve following a flush cycle, and is not limited to use with float actuated systems. In these other systems, the detent of the invention acts directly on an inlet valve to prevent flow of water into the flush tank except following a deliberate flush cycle.

The invention thus applies to all types of flush valve assemblies, including those which utilize floats, and those which use other means for closing the water inlet valve following a flush cycle.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein:

FIG. 2 is an enlarged fragmentary view in elevation, with portions shown in section, of a preferred form of water inlet flow control mechanism according to the invention wherein a primary inlet valve is positioned upstream of the usual valve and controlled by the float, and a hydraulic detent mechanism is used to keep the valve closed until a flush cycle is initiated;

FIG. 3 is a further enlarged fragmentary view in elevation, with portions shown in section, depicting a first form of actuator to open the primary inlet valve;

FIG. 4 is an enlarged fragmentary sectional view in elevation similar to FIG. 3, showing a second form of actuator for initiating opening movement of the primary water inlet control valve;

FIG. 5 is a view similar to FIG. 2, showing a different type of hydraulic mechanism and system for controlling operation of the primary water inlet control valve;

FIG. 9 is a top exploded view of a second form of detent actuating assembly for controlling opening of the water inlet valve at the initiation of a flush cycle;

FIG. 10 is a rear view in elevation of the actuating assembly of FIG. 9;

FIG. 11 is a rear view in elevation similar to FIG. 10, showing a variation of the actuating assembly;

DETAILED DESCRIPTION OF THE PREFERRED EMBODIMENTS

Figure 1:
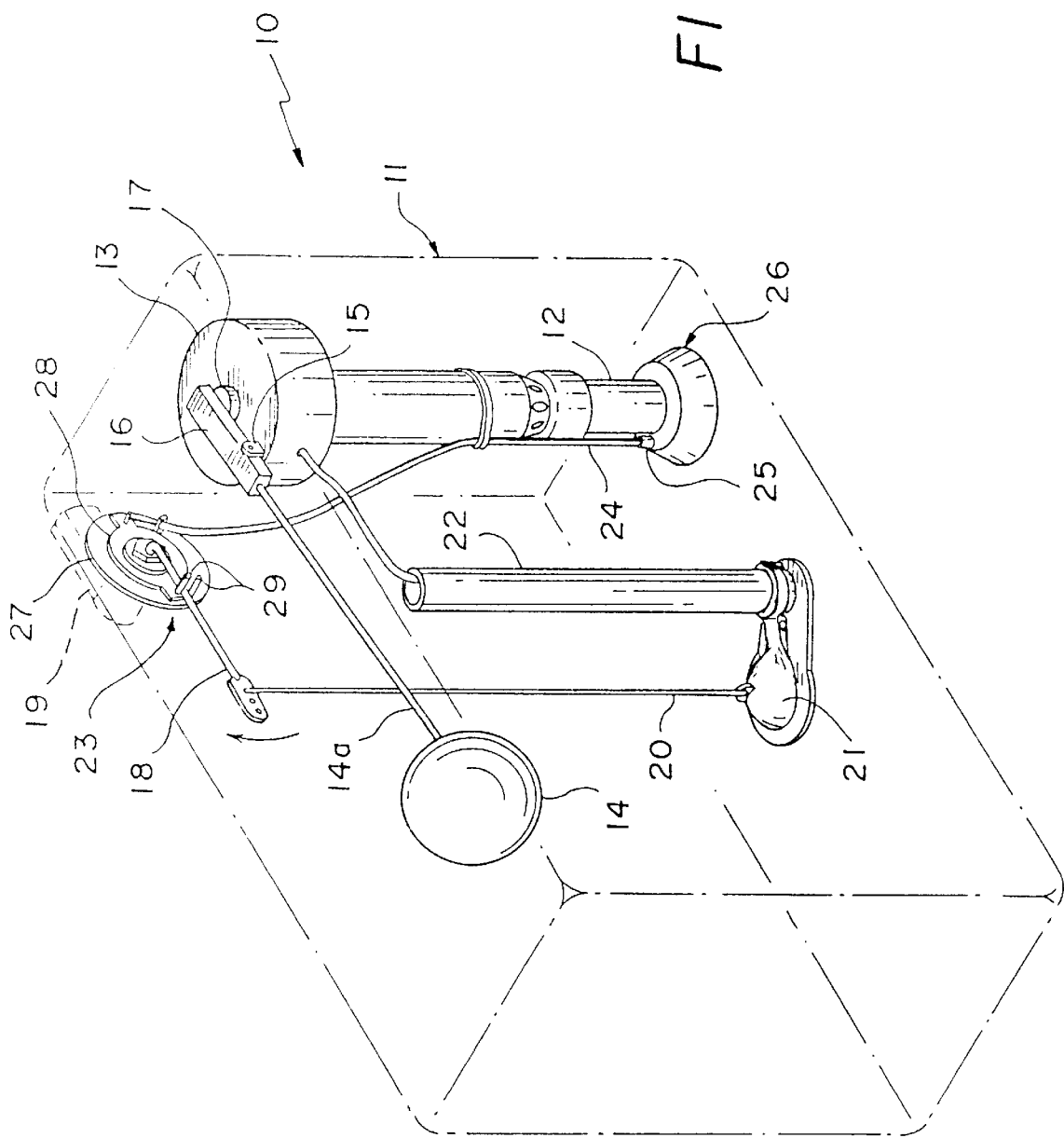
FIG. 1 is a top perspective view of a typical toilet flush assembly incorporating therein one embodiment of the present invention.
Figure 6:
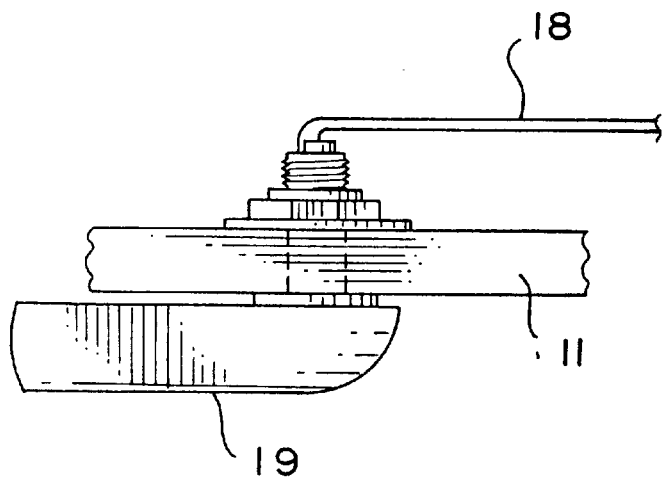
FIG. 6 is a top plan view of a portion of a flush tank wall, showing a typical conventional flush handle and flush rod assembly.

A toilet flush assembly is indicated generally at 10 in FIG. 1. The assembly includes a tank 11 for holding a quantity of water which is released to flush a toilet, not shown. A water supply tube 12 is connected with a suitable source of water, not shown, and flow from the supply tube 12 into the tank is controlled by a water inflow valve 13 positioned at the top of the tube 12. The valve is controlled by a float 14 and associated float arm 14a which moves about a pivot 15 to position a rear portion 16 of the float arm against an actuating button 17 that connects with the inflow valve to hold it against its seat. A flush rod 18 is connected for movement with a flush handle or lever 19 mounted outside the tank 11, and controls movement of a link 20 that is connected with a flap type flush valve 21 to raise the flap valve and open the outlet from the tank during a flush cycle. An overflow tube 22 is connected to the bottom of the tank adjacent the valve 21. The structure thus far described is conventional and illustrates one form of toilet flush assembly on which the present invention may be used. It should be understood, however, that the invention may also be used with those types of flush assemblies in which a float moves vertically on the water supply tube 12 to control opening and closing of the water inlet valve at the top of the tube.

The present invention comprises an actuator assembly 23 positioned inside the tank on the mounting shaft for the flush lever 19 for movement with the flush lever. The actuator assembly is connected through a cable 24 with a detent mechanism 25 that controls a primary water inlet valve 26 at the bottom of the supply tube 12 so that inflow of water to the tank is prevented except when a deliberate flush cycle is initiated.

Figure 7:
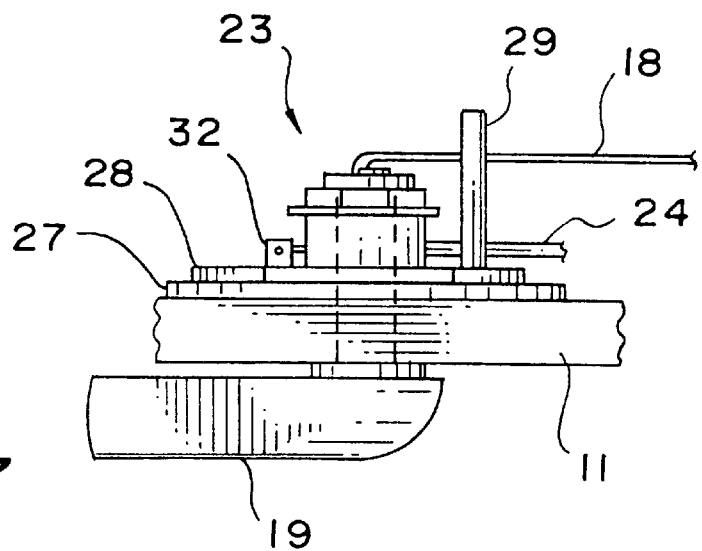
FIG. 7 is a top plan view showing a first form of detent actuating mechanism according to the invention applied to the flush actuating assembly of FIG. 6.
Figure 8:
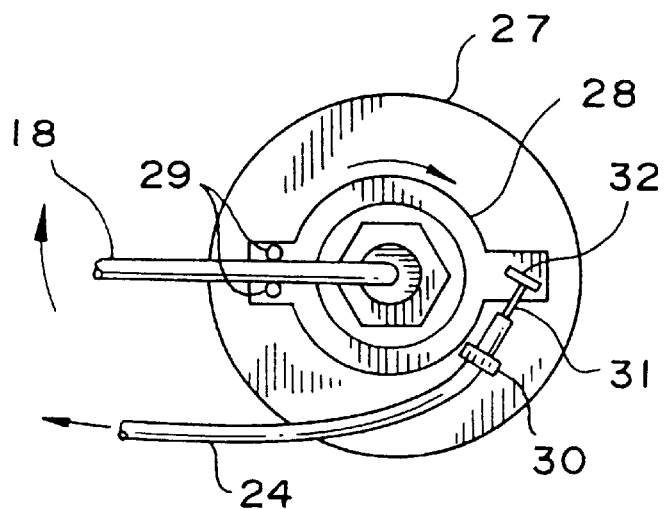
FIG. 8 is a rear view in elevation of the detent actuating mechanism of FIG. 7.

The actuating mechanism 23 is best seen in FIGS. 7 and 8 and comprises a stationary mounting plate 27 held against an inner surface of the wall of tank 11 behind the flush lever 19. A rotatable follower plate 28 is positioned against the mounting plate 27 for rotation relative thereto and includes a pair of rearwardly projecting pins or prongs 29 that extend in closely spaced parallel relationship to one another on opposite sides, respectively, of the flush rod 18, so that when the flush lever 19 is rotated to cause upward swinging movement of the flush rod 18, the prongs 29 are constrained to follow the flush rod, thus causing rotation of the follower plate 28.

The cable 24 is secured to the mounting plate 27 by a connector 30, with the free, movable cable end or wire 31 of the cable extending into abutting relationship with a cable stop 32 carried by the follower plate 28. Thus, when the flush lever 19 is rotated downwardly to initiate a flush cycle, the flush rod 18 is pivoted upwardly, pushing along the prongs 29 and rotating the follower plate 28 in a clockwise direction (as viewed in FIG. 8), whereby the stop 32 pushes against the cable wire end 31, pushing the cable wire inwardly to actuate the detent 25 at the bottom of the inlet tube 12 to open the primary water inlet valve 26.

The detent mechanism 25 that is controlled by the cable 24 is seen best in FIGS. 2–5.

The preferred form of the invention shown in FIGS. 2–4 utilizes a spring biased detent 25 with a hydraulic timing device to maintain the primary inlet valve 26 closed until a flush cycle is initiated by depressing the flush lever 19. The primary inlet valve 26 is held in closed position by depressing valve pin 26a, and is moved to an open position by elevating the pin 26a. The valve 26 is of conventional construction and will not be further described herein.

To elevate the pin 26a for opening the valve 26, an abutment 33 is provided on the pin for cooperation with a lever 34 that is pivoted by extension of the cable wire 31 when the flush lever 19 is operated. Thus, depression of the flush lever 19 causes the flush rod 18 to elevate, rotating the follower plate 28 and pushing the cable wire 31 outwardly of its sheath to engage one end of the lever 34 to depress it, simultaneously raising the other end and contacting the abutment 33 to raise the pin 26a and open the primary inlet valve 26. The lever 34 is normally maintained in a position spaced from the abutment 33 by a compression spring 35 engaged against that end of the lever which is depressed by the cable wire 31. If desired, the end 31 of the cable may be enclosed in a water tight seal such as bellows 36 (FIG. 4).

The detent for holding the valve pin 26a depressed and keeping the primary inlet valve 26 closed until a flush cycle is initiated comprises a hydraulic mechanism including a cylinder 37 supported in the bottom of tube 12, with a piston 38 reciprocable therein. A first one way valve 39 in the bottom of the cylinder enables flow of water into the cylinder beneath the piston to raise the piston against the downward bias of a spring 40, and a second one way valve 41 at the upper end of the cylinder enables flow of water out through the upper end of the cylinder, but prevents reverse flow back into the cylinder through the upper end. A flexible annular bypass valve 42 is engaged between the outer surface of the cylinder and the inner surface of tube 12 to enable flow around the cylinder and through the inlet valve 13 that is controlled by the float.

In operation of this from of the invention, when the flush lever 19 is depressed to elevate the flush rod 18 and open the outlet valve 21 to enable the tank to empty, the follower plate 28 is caused to rotate by movement of the flush rod against the pins or prongs 29, causing the follower plate to push against the cable wire 31 and causing it to extend outwardly at the lower end of the cable to pivot the lever 34 and raise the pin 26a to open the primary inlet valve to enable flow of water to move upwardly past the valve 39, elevating the piston 38 against the bias of spring 40. Water above the piston flows outwardly through valve 41 at the upper end of the cylinder 37. When the piston reaches its upper limit of travel, the valves 39 and 41 close and flow through the cylinder 37 stops. Flow occurs around the cylinder past the valve 42. In this regard, it should be noted that the valves 39 and 41 have greater flexibility than valve 42 and thus open at a lower water pressure. Water flowing upwardly through the tube 12 thence flows through the valve 13, which is now open because of lowering of the float and movement of the actuator 16 away from valve button 17.

With the valves 39 and 41 closed, there is static hydraulic pressure within cylinder 37, and the spring begins moving the piston 38 downwardly in the cylinder, Controlled leakage of fluid past the piston results in a timed rate of descent of the piston, so that the inlet valve 26 remains open for a length of time necessary to refill the tank with water. The piston 38 then engages 26A, forcing it down to close the valve 26. This action occurs independently of the position or condition of the float, valve 13, or valve 21, thus ensuring that there cannot be further leakage from the tank in spite of failure of the float, or one or both of valves 13 and 21.

Assuming normal operation of the float and the valve 21, as the tank fills with water the float rises with the water level and gradually closes the valve 13 by depressing the button 17. Water pressure equalizes inside cylinder 37 as described before, whereby the spring 40 begins moving the piston 38 downwardly. Downward movement of the piston is possible because of predetermined leakage of water past the piston, either around its outer periphery or through one or more small openings provided through the piston, until the piston reaches the bottom of the cylinder after a predetermined time interval, engaging the end of pin 26a and pushing it downwardly to close the primary inlet valve. With the primary inlet valve 26 closed, it is not possible for additional water to flow into the tank until a flush cycle is again initiated by operating the flush lever. Thus, even if a leak should develop past the outlet valve 21, resulting in a lowering of the water level in the tank and dropping of the float, enabling the inlet valve 13 to open, no additional water can flow into the tank since the primary inlet valve 26 remains closed due to contact of the piston 38 with the valve pin 26a.

A modification of the actuator system for opening the primary inlet valve 26 is shown in FIG. 4, wherein the cable 24 extends to a housing 43 through which the cable wire end 31 extends into close proximity with the abutment 33 on valve pin 26a, for direct action on the valve pin rather than acting through an intermediate lever as in the embodiment of FIG. 3. The cable wire 31 is biased away from the abutment 33 by a spring 44, and the end 31 of the cable wire may be encased in a seal 36 such as that used in the embodiment of FIG. 3. In all other respects, this form of the invention functions the same as that described in relation to FIG. 3.

A modification of the invention of FIG. 2 is indicated generally at 45 in FIG. 5. In this form of the invention, the valves 39, 41 and 42 are omitted, and a plurality of openings 46 are provided through a lower end of the cylinder 47, with piston 48 being reciprocable in the cylinder and biased toward the bottom end thereof by spring 49.

In operation of this form of the invention, actuation of the flush lever 19 causes the cable wire 31 to extend from the bottom end of the cable 24, as previously described, pivoting lever 34 to raise valve pin 26a and open the primary inlet valve 26. Upon opening of this valve, water flows into the cylinder beneath the piston, forcing the piston upwardly in the cylinder 47, while the principal flow of water occurs through the openings 46 and around the cylinder. As the tank fills following a flush cycle, and the float rises, the abutment 17 is depressed to close the valve 13 that is controlled by the float, whereby flow through the tube 12 ceases and the pressure equalizes above and below the piston, enabling the spring 49 to force the piston downwardly into contact with the pin 26a to depress the pin and close the primary inlet valve 26. The primary inlet valve will remain closed even if the tank should empty due to a leak past the outlet valve 21, until a flush cycle is again initiated.

A variation of the actuator assembly 23 is indicated generally at 23' in FIGS. 9 and 10. In this form of the invention, a base plate 50 is first assembled on the flush handle mounting sleeve, and the mounting plate 27 and follower plate 28 are then assembled against the base plate 50. It will be noted that the base plate 50 has a cylindrical hub 51 on which both the mounting plate 27 and the follower plate 28 are rotatably positioned. A spring 52 is connected between the hub 51 and mounting plate 27 to bias the mounting plate 27 in a clockwise direction as viewed in FIG. 10. This resilient connection between base plate 50 and mounting plate 27 is intended to accommodate variations in the dimensions and assembly positions of the various components comprising the actuator to prevent stressing of the components, and to eliminate the need for carefully and accurately positioning all of the components to insure proper travel of the actuator elements. That is, the yieldable connection between mounting plate 27 and base 50 absorbs any misadjustment of parts when the flush lever 23 is depressed to elevate the flush rod 18, causing rotation of the follower plate 28 to actuate the cable. Thus, and with reference to FIG. 10, if the position of the end of the cable 24 is too close to the stop 32 in the at-rest position of the follower plate 28, subsequent depression of the flush lever and consequent rotation of the follower plate 28 would be hindered by contact between the stop 32 and the end of cable 24. This may interfere with proper operation of the flush mechanism. However, in accordance with the variation shown in FIGS. 9 and 10, improper adjustment between the cable end and the at-rest position of the follower plate 28 would be accommodated by the yieldable connection 52. Thus, and with reference to FIG. 10, clockwise rotation of the follower plate 28 could continue even after the stop 32 contacts the end of cable 24 due to the yielding of spring 52, which would enable plate 27 to rotate relative to plate 50. Otherwise, operation of the actuator 23' is normal due to the relatively high resistance of spring 52. In other words, in normal operation the mounting plate 27 remains stationary just as in the form of the invention previously described. However, if the stop 32 should contact the end of stationary cable 24 prior to full movement of the flush lever 19 and full rotation of the follower plate 28, the spring 52 yields to accommodate any further movement required of the flush components.

A different approach to this concept is indicated generally at 23" in FIG. 11. In this variation, a yieldable coupling 53 is interposed between the stop 32' carried by the follower plate 28, and the cable end 31 to absorb any misadjustment between the range of movement of follower plate 28 and the position of the end of cable 24. In this variation, a housing 54 is attached to the mounting plate 27 in place of the mounting bracket 30 previously utilized, and a plunger 55 reciprocable in the housing 54 engages the end 31 of the cable to push the cable when the follower plate is rotated. A spring 56 is interposed between the plunger 55 and stop 32' to absorb any rotation of follower plate 28 required to accomplish a flush cycle, in the event that cable 24 is positioned too close to the stop 32' to accommodate this full movement. Guide rod 57 extends from plunger 55 through an opening in stop 32' to permit reciprocating movement of the plunger relative to the stop when the spring 56 is compressed. The resistance of spring 56 is selected so that operation of the actuator is normal in the absence of any misadjustment between the at-rest positions of the follower plate 28 and cable 24.

Figure 12:
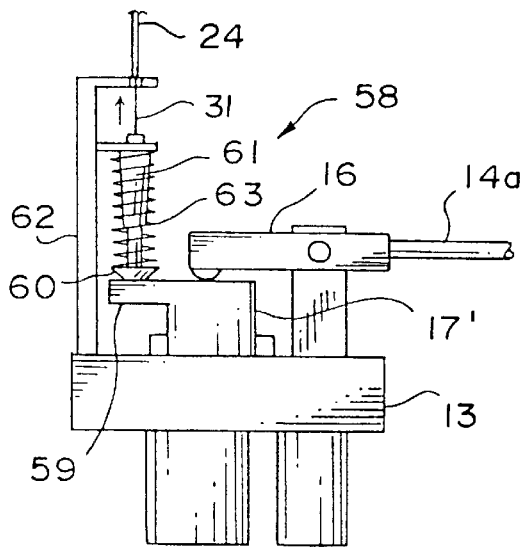
FIG. 12 is a schematic view in elevation of a third form of water inlet control mechanism according to the invention, wherein the mechanism is applied to the inlet valve controlled by the float, showing the assembly in valve closed position.
Figure 13:
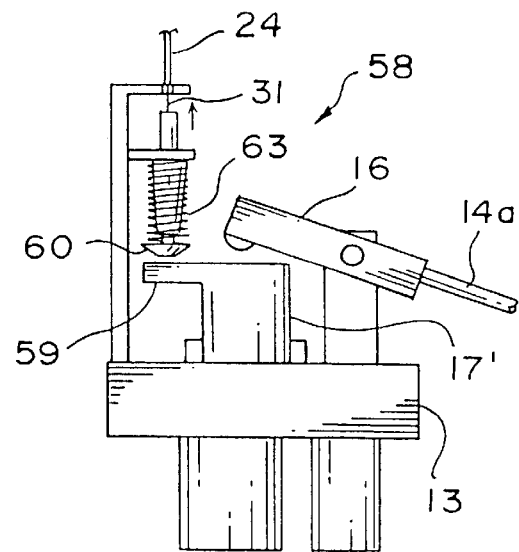
FIG. 13 is a view in elevation of the assembly of FIG. 12, but showing the valve in open position.

In the modification 58 shown in FIGS. 12 and 13, the detent mechanism is applied to the valve 13 controlled by the float 14, and the primary inlet valve described in the preceding forms of the invention is eliminated. Thus, in this form of the invention, the valve button 17' is modified to have an extension 59 projecting from one side thereof for cooperation with a plunger 60 carried in cylinder 61 mounted to a frame or bracket 62 supported on the valve 13. A spring 63 biases the plunger 60 downwardly against the extension 59 to depress the button 17' and maintain the valve 13 closed until the plunger 60 is pulled upwardly against the bias of spring 63 by cable wire 31. The cable wire 31 is connected to be retracted, rather than extended, by operation of the flush handle 19, and to this end is connected to an actuating mechanism 23 or 23' such as previously described, except that the cable 24 is attached to the mounting plate 27 on the opposite side of the pivot axis of flush rod 18, and the cable wire end 31 is connected to the stop 32, so that when the follower plate 28 is rotated in a clockwise direction as shown in FIGS. 8 or 10, for example, the cable wire end 31 is extended or withdrawn from the cable 24 to exert a pulling force on the plunger 60 to retract it against the bias of spring 63. The plunger 60 is connected through a viscous coupling in the cylinder 61 so that it may be quickly withdrawn upon retraction of the cable wire end 31, but upon return of the flush handle and the cable wire end 31 to their original positions, downward movement of the plunger 60 is damped so that there is a delay in return of the plunger 60 to its extended position to depress the valve button 17' to close the inlet valve 13. This insures that after initiation of a flush cycle and emptying of water from the tank, and lowering of the float arm 14a to open valve 13 to refill the tank, the valve 13 will not be closed until the tank has been refilled and the flush arm 14a returned to its position shown in FIG. 12. At this time, the viscous coupling is designed so that the plunger 60 will also engage the extension 59 to positively retain the valve button 17' depressed and the valve 13 closed, in spite of the subsequent position of the float arm 14a and actuator extension 16, as might be caused, for example, by a leak occurring from the tank and a lowering of the water level therein.

Figure 14:
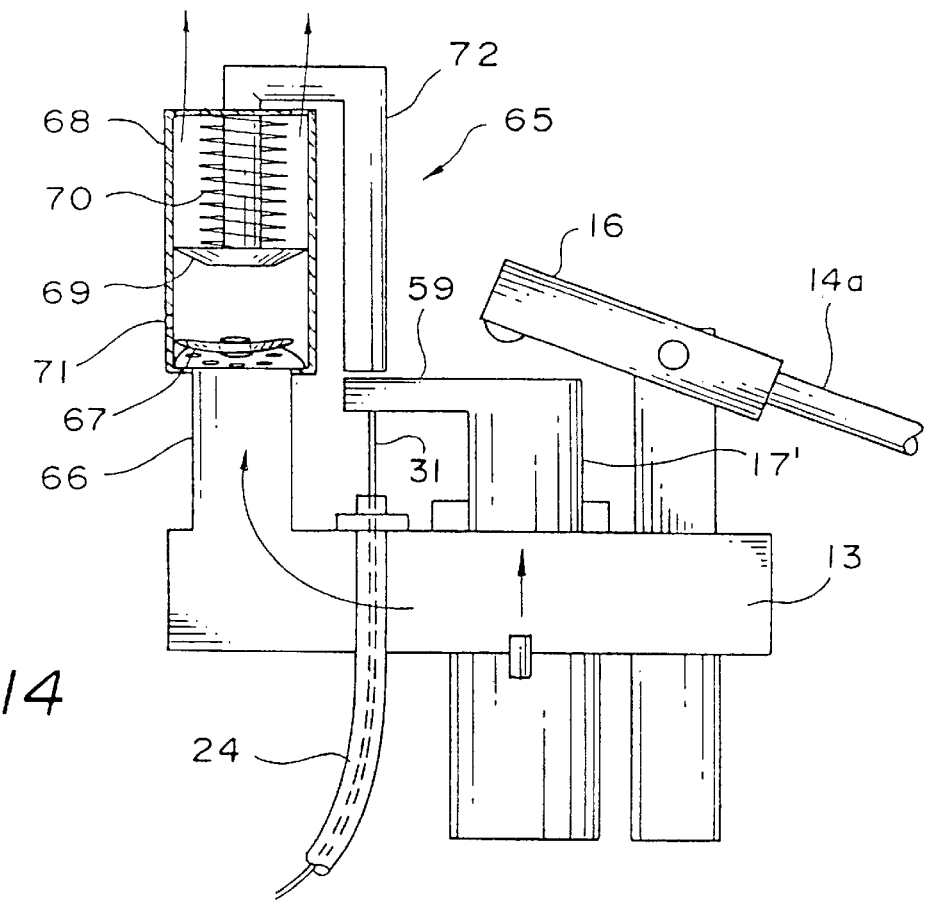
FIG. 14 is a view similar to FIG. 13, showing a variation of the detent mechanism for holding the inlet valve closed, and depicting the valve in open position.

A variation of that form of the invention shown in FIGS. 12 and 13 is indicated generally at 65 in FIG. 14. As in the previously described forms of the invention, the valve 13 is held closed by engagement of a detent against extension 59 on valve button 17'. Opening of the valve 13 can be accomplished only by actuation of the flush handle and extension of cable end 31 to engage the extension 59 and raise the button 17' against the action of the detent engaged with the extension 59. In this form of the invention, the detent comprises an extension 66 on the housing of valve 13, which conveys fluid past one way valve 67 and into cylinder 68 beneath plunger 69 to raise the plunger in the cylinder against the bias of spring 70. This results in a quantity of water being trapped between plunger 69 and valve 67 in the cylinder 68, to prevent free return movement of the plunger under the action of spring 70 when the cable end 31 is withdrawn to permit downward closing movement of valve button 17'. A calibrated vent 71 exhausts fluid from beneath the plunger 69 to permit timed downward movement of the plunger and the detent arm 72 which engages extension 59 on button 17'. After the plunger 69 and detent arm 72 reach their bottom limit of travel, the button 17' is fully depressed to hold the inlet valve 13 closed until a subsequent flush cycle is initiated.

Figure 15:
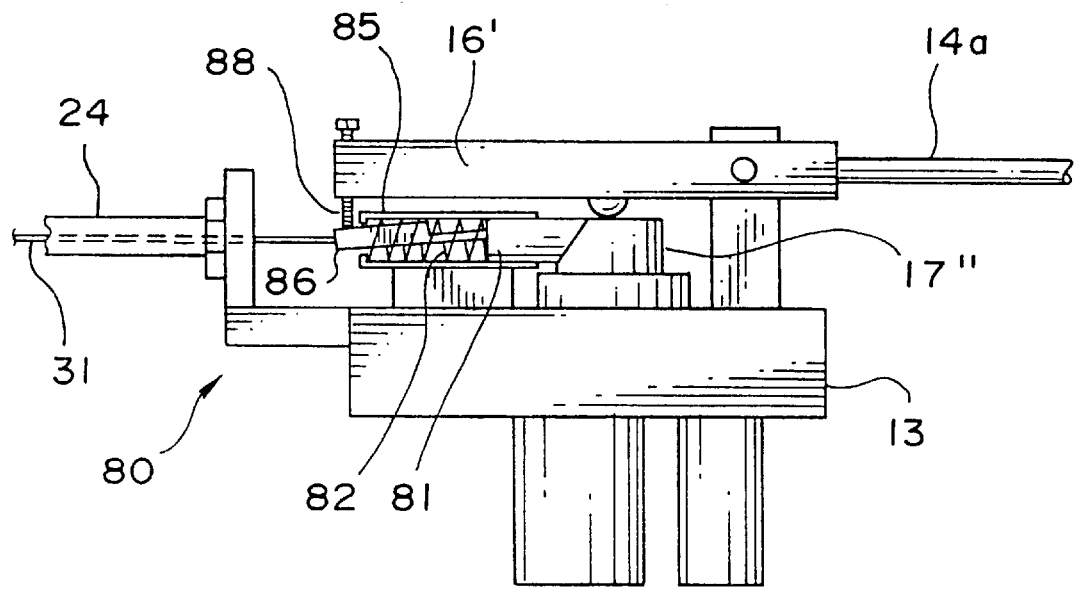
FIG. 15 is a view in elevation of a fifth form of water inlet control mechanism according to the invention, wherein the detent is mechanical in operation and is shown in blocking position to retain the water inlet valve in closed position.
Figure 16:
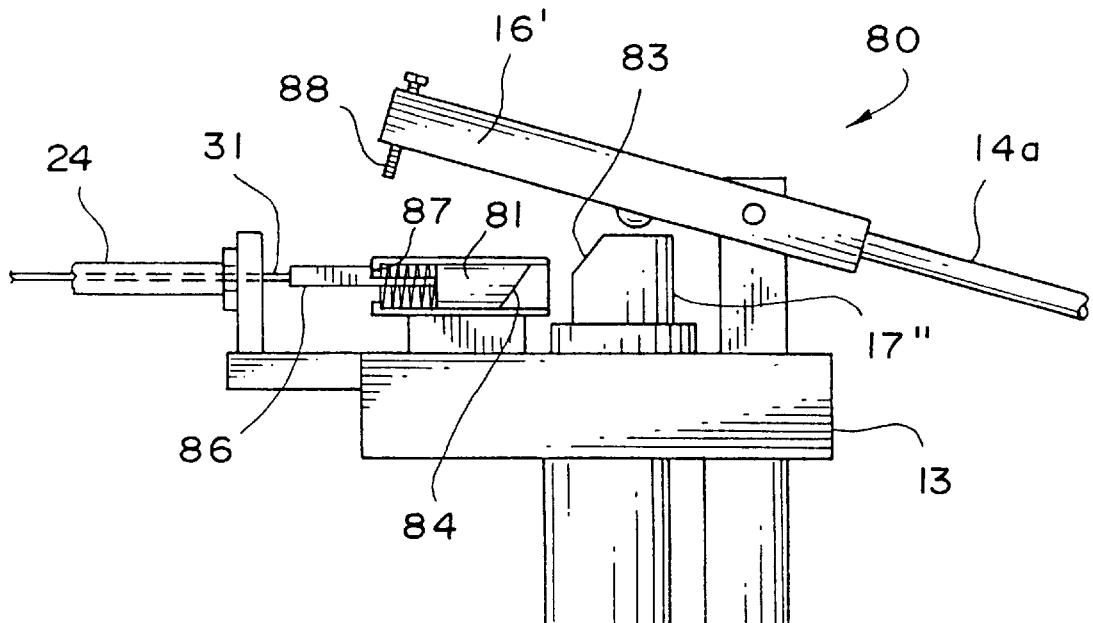
FIG. 16 is a view of the assembly in FIG. 15, showing the detent moved to an unblocking position and the water inlet valve open following downward movement of the float in response to a flush cycle.

In contrast to the previously described forms of the invention, which utilize hydraulic detent mechanisms, that form of the invention shown in FIGS. 15 and 16 relies upon a mechanical detent 80 to hold the valve 13 closed until a flush cycle is deliberately initiated by depression of the flush lever 19. In this form of the invention, the valve button 17" is held in a depressed position, closing the inlet valve 13, by a plunger 81 that is biased forwardly into engagement with the valve button 17" by spring 82. It will be noted that the valve button 17" and plunger 81 have complementally shaped surfaces 83 and 84, respectively, which engage one another when the plunger 81 is in its forward position.

The plunger 81 is reciprocable in a housing 85 supported on the valve 13, and includes a stem 86 projecting rearwardly through the housing and having a stop shoulder 87 thereon which engages the end of housing 85 to retain the plunger in its retracted position after it has been fully retracted in the housing by pulling back on the cable end 31 upon actuation of the flush assembly.

Forward movement of the plunger 81 into engagement with valve button 17" is prevented until the water level in the tank rises and the float is elevated to lower the rearward portion 16' of the float arm to depress valve button 17" for closing valve 13, and to bring adjustable release member 88 into engagement with the tail or stem 86 to releases the stop 87 and permit the spring 82 to project the plunger 81 forwardly into engagement with valve button 17" to hold the valve button depressed and the valve 13 closed.

Figure 17:
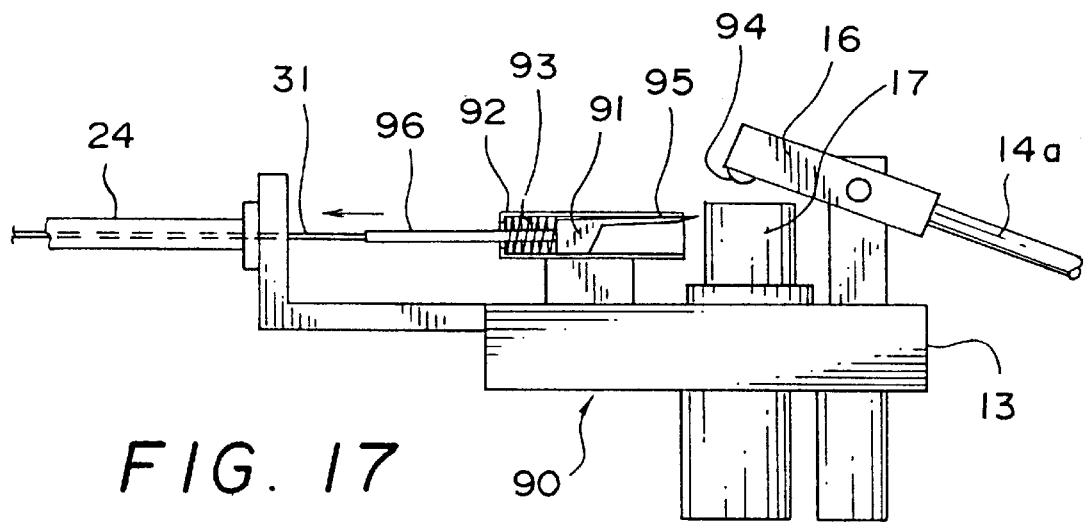
FIG. 17 is a view similar to FIG. 16, showing a variation of the mechanical detent, with the detent in a non-blocking position and the inlet valve open.
Figure 18:
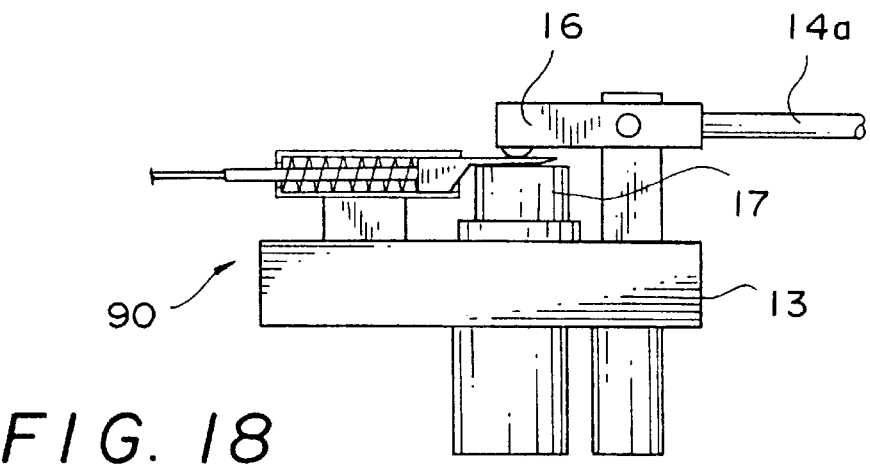
FIG. 18 is a view similar to view 17, but showing the valve in closed position and the detent in a forwardly biased position to block opening movement of the water inlet valve.
Figure 19:
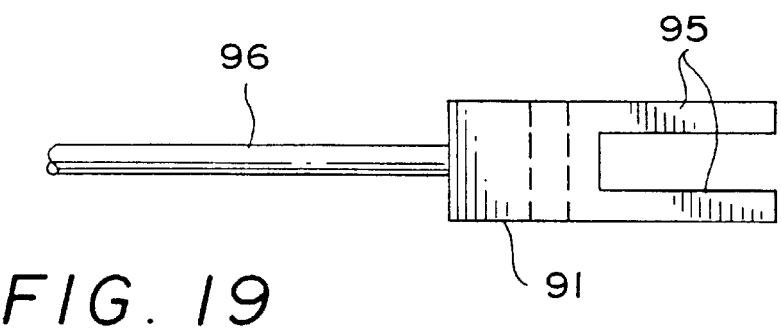
FIG. 19 is a top plan view of the bifurated plunger used in the detent of FIGS. 17 and 18.

FIGS. 17, 18 and 19 show a variation 90 of the mechanical detent illustrated in FIGS. 15 and 16. In this form of the invention, the valve button 17 and actuator arm portion 16 of the float arm are essentially conventional, and a detent plunger arm 91 is reciprocable in a housing 92 positioned to one side of the valve button 17 so that the plunger is biased forward by spring 93 into blocking relationship to the valve button 17 when the valve button is depressed by elevation of the float 14 and downward movement of the actuating arm portion 16. It will be noted that a protrusion 94 may be provided on the underside of actuating arm portion 16 for contacting the valve button 17, and in this event the forward end of plunger 91 may be bifurcated at 95 to straddle the protrusion 94.

The plunger 91 has a tail or stem 96 which protrudes rearwardly from the housing 92 and is connected with the cable wire end 31 so that the plunger may be withdrawn upon retraction of the cable when the flush handle is operated to initiate a flush cycle.

When a flush cycle is initiated, and the tank empties of water, the float 14 falls to the position shown in FIG. 17, and because the plunger 91 has been retracted upon operation of the flush handle, the valve button 17 is enabled to elevate to the position shown in FIG. 17, with the bifurcated end 95 of plunger 91 resting against the side of valve button 17. As the tank fills with water and the float rises, the valve button 17 is depressed by actuator arm portion 16, whereby the plunger may again be moved forwardly by the spring 93 into blocking relationship over the valve button 17 to hold it closed as shown in FIG. 18. The plunger will remain in this position holding the inlet valve 13 closed until a flush cycle is again initiated.

Figure 20:
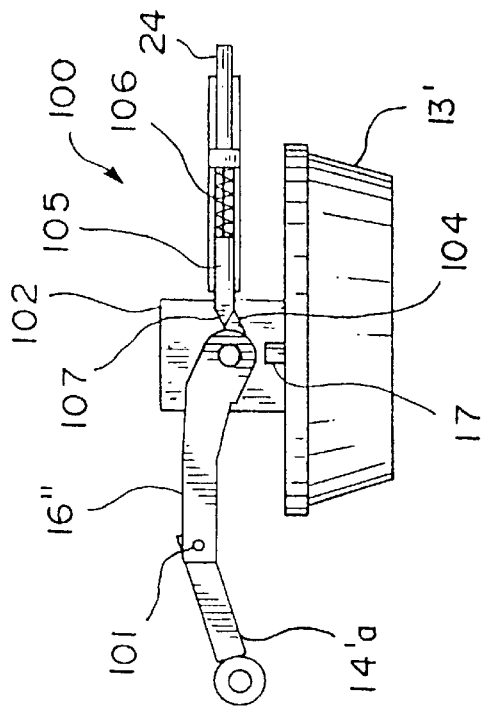
FIG. 20 is a side view in elevation of a further form of the invention wherein the mechanical detent acts on the float arm rather than on the water inlet valve, the assembly being shown in this figure in a valve open position with the float having moved downwardly in response to a flush cycle.
Figure 21:
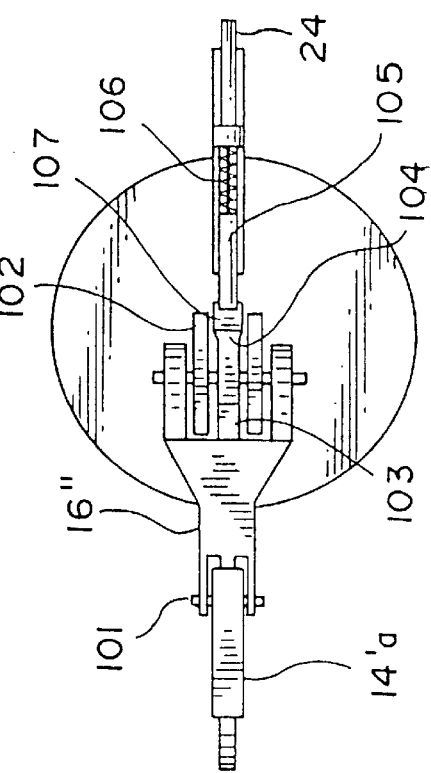
FIG. 21 is a top plan view of the assembly of FIG. 20.
Figure 22:
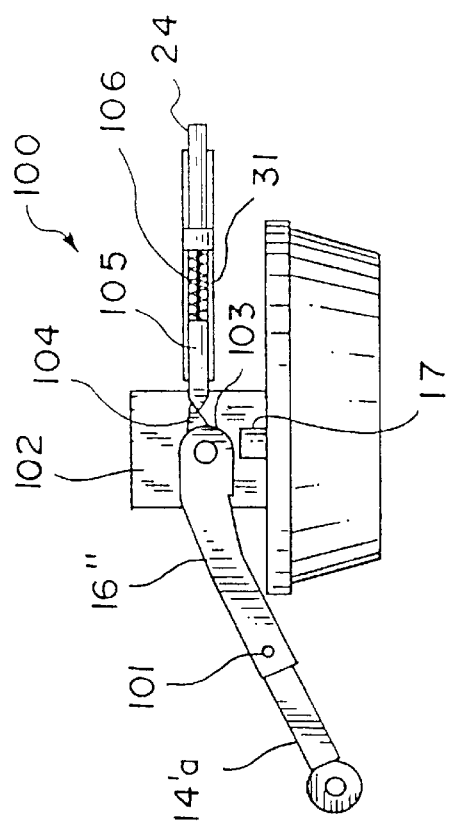
FIG. 22 is a side view in elevation similar to FIG. 20, showing the rear portion of the float arm in position to close the water inlet valve, and showing the detent in blocking position to prevent opening movement of the valve-contacting rear portion of the float arm.
Figure 23:
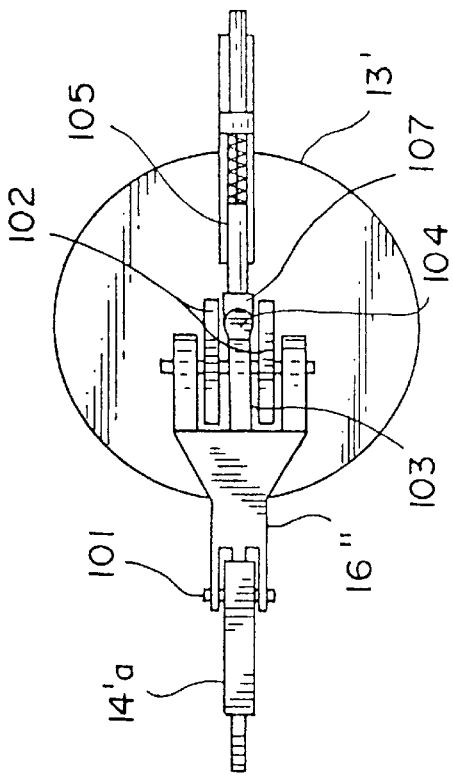
FIG. 23 is a top plan view of the assembly of FIG. 22.

A still further form of the invention is indicated generally at 100 in FIGS. 20–23. In this form of the invention, the float arm 14a' is articulated at a joint 101 between its ends which permits downward bending movement of the free end portion of the arm, as shown in FIG. 22, if the water level in the tank falls but a flush cycle has not been initiated, but prevents upward flexing movement beyond the position shown in FIG. 20 when the water level rises. This articulated joint thus enables the free end of the float arm and the attached float to drop with a lowered water level without imposing stress on that portion of the float arm that contacts the valve button 17 to hold the valve 13' closed, or to impose stress on the detent which engages the float arm to hold the rear portion thereof in a valve blocking position as depicted in FIGS. 22 and 23.

The float arm 14a' is mounted on a pair of brackets 102 carried by the housing for valve 13', and the rear actuating arm portion 16" of the float arm includes a center valve actuating finger 103 having a shaped nose 104 on its end. The finger 103 includes a shaped end portion for contacting the valve button 17 to close the valve 13' when the float arm 14a' is elevated.

The valve actuating arm portion 16" of the float arm is held in its valve closing position, as shown in FIGS. 22 and 23, by a plunger 105 which is biased forwardly by a spring 106 to bring the nose portion 107 of plunger 105 into overlying relationship to the shaped nose 104 on the valve actuating finger 103 of float arm portion 16". See FIGS. 22 and 23. In this position, the plunger 105 holds the float actuating arm portion 16" in the position shown to maintain the valve button 17 depressed and the valve 13' closed. Retraction of the plunger 105 by actuation of the flush handle releases the float arm to enable it to drop as shown in FIGS. 20 and 21, enabling the valve button 17 to rise and the valve 13' to open.

With the parts shown in the relationship illustrated in FIGS. 20 and 21, the shaped surfaces on the nose portions 104 and 107 are such that the float arm can elevate and move downwardly past the plunger 105 to the position shown in FIG. 22. In other words, the shaped surfaces enable portion 104 to slide past portion 107, pushing the plunger 105 back.

While particular embodiments of the invention have been illustrated and described in detail herein, it should be understood that various changes and modifications may be made to the invention without departing from the spirit and intent of the invention as defined by the scope of the appended claims.

What is claimed is:

1. A flush valve actuator comprising:
   means for opening a flush valve means for releasing water from a tank to flush a toilet and
   means for moving a detent means for preventing opening of an inlet valve means for controlling flow of water into a toilet flush tank until a deliberate flush cycle is initiated, further wherein the detent means comprises a detent member that has a first position in direct abutting engagement with the inlet valve means for blocking opening movement of the inlet valve means and a second position that enables the inlet valve means to open, when said detent member is moved out of abutting engagement with said inlet valve, for permitting water to flow past said inlet valve into said tank, and
   a detent actuator means connected between the flush valve actuator means and the detent member to move the detent member between its first and second positions and a biasing force acting on said detent member to close said inlet valve irregardless and independently of operation of the inlet valve means.

2. The flush valve actuator described in claim 1 wherein the detent member is yieldably biased into the first position.

3. The flush valve actuator described in claim 1 further wherein the flush valve actuator simultaneously opens the flush valve means and moves the detent means.

4. The flush valve actuator described in claim 1 wherein the detent actuator means includes a first member that is movable when the flush valve actuator is actuated to open the flush valve means for initiation of a flush cycle, and a second member connects the first member to the detent member to move the detent member to is second position when the first member is moved in response to initiation of a flush cycle.

5. The flush valve actuator described in claim 4 further comprises a flush lever supported outside the tank for rotation about an axis, and an elongate flush rod connected with the flush lever for up and down swinging movement as the flush lever is depressed and released, said flush rod being connected with the flush valve means to open it when the flush lever is depressed and said first member comprises a rotatable follower that engages and is moved by movement of said flush rod.

6. The flush valve actuator described in claim 5 wherein the second member comprises a cable connecting the follower and the detent member.

7. The flush valve actuator described in claim 6 wherein a resiliently yieldable connection is provided between the follower and the cable to absorb excessive relative movement therebetween.

8. A toilet flush assembly including an inlet valve and a flush valve, the toilet flush assembly further comprising:
   a detent,
   a flush valve actuator and a detent actuator,
   wherein the flush valve actuator and the detent actuator are connected so that operation of the flush valve actuator causes simultaneous operation of the detent actuator upon deliberate initiation of a flush cycle,
   further wherein the detent comprises a detent member that has a first position in direct abutting engagement with the inlet valve for blocking opening movement of the inlet valve in a second position that enables the inlet valve to open, when said detent is moved out of abutting engagement with said inlet valve for permitting water to flow past said inlet valve into said tank,
   wherein the detent actuator moves the detent between its first and second positions and further wherein a biasing fore acting on the detent closes the inlet valve irregardless and independently of operation of the inlet valve.

9. The toilet flush valve assembly described in claim 8 wherein the detent member is yieldably biased in the first position.

10. The toilet flush assembly described in claim 8 wherein the detent actuator is connected between the flush valve actuator and the detent member and moves the detent member between its first and second positions independently of the operation of the inlet valve.

11. The toilet flush assembly described in claim 8 wherein the detent actuator includes a first member that is movable when the flush valve actuator is actuated to open the flush valve for initiation of a flush cycle, and a second member connects the first member to the detent member to move the detent member to the second position when the first member is moved in response to initiation of a flush cycle.

12. The toilet flush assembly described in claim 11 wherein the flush valve actuator includes a flush lever supported outside a toilet flush tank for rotation about an axis, and an elongate flush rod connected with the flush lever for up and down swinging movement as the flush lever is depressed and released, said flush rod being connected with the flush valve to open the flush valve when the flush lever is depressed and said first member comprises a rotatable follower that engages and is moved by movement of said flush rod.

13. The toilet flush assembly described in claim 11 wherein the second member comprises a cable connecting the follower and the detent member.

14. The toilet flush assembly described in claim 11 wherein a resiliently yieldable connection is provided between the flush valve actuator means and the detent means to absorb excessive relative movement therebetween.

* * * * *